(12) United States Patent
Tate et al.

(10) Patent No.: US 12,441,910 B2
(45) Date of Patent: Oct. 14, 2025

(54) SILICONE-BASED BARRIER COMPOSITIONS

(71) Applicants: DOW GLOBAL TECHNOLOGIES LLC, Midland, MI (US); DOW SILICONES CORPORATION, Midland, MI (US); ROHM AND HAAS COMPANY, Collegeville, PA (US)

(72) Inventors: Michael P. Tate, Midland, MI (US); Zhifeng Bai, Houston, TX (US); Jodi M. Mecca, Midland, MI (US); Tirtha Chatterjee, Collegeville, PA (US); Yiyong He, Midland, MI (US); Michael Brasseur, Midland, MI (US); Sudhakar Balijepalli, Midland, MI (US); John J. Rabasco, Collegeville, PA (US)

(73) Assignees: DOW GLOBAL TECHNOLOGIES LLC, Midland, MI (US); DOW SILICONES CORPORATION, Midland, MI (US); ROHM AND HAAS COMPANY, Collegeville, PA (US)

( * ) Notice: Subject to any disclaimer, the term of this patent is extended or adjusted under 35 U.S.C. 154(b) by 841 days.

(21) Appl. No.: 17/624,318

(22) PCT Filed: Jul. 1, 2020

(86) PCT No.: PCT/US2020/040401
§ 371 (c)(1),
(2) Date: Dec. 31, 2021

(87) PCT Pub. No.: WO2021/003205
PCT Pub. Date: Jan. 7, 2021

(65) Prior Publication Data
US 2022/0363945 A1 Nov. 17, 2022

Related U.S. Application Data

(60) Provisional application No. 62/870,111, filed on Jul. 3, 2019.

(51) Int. Cl.
C09D 183/06 (2006.01)
C09D 5/02 (2006.01)
C09D 7/61 (2018.01)

(52) U.S. Cl.
CPC .......... *C09D 183/06* (2013.01); *C09D 5/028* (2013.01); *C09D 7/61* (2018.01)

(58) Field of Classification Search
CPC .......... C09D 183/06; C09D 5/02; C09D 7/61
USPC ........................................................ 524/425
See application file for complete search history.

(56) References Cited

U.S. PATENT DOCUMENTS

| | | |
|---|---|---|
| 2,676,182 A | 4/1954 | Daudt et al. |
| 3,382,205 A | 5/1968 | Beers |
| 5,034,455 A | 7/1991 | Stein et al. |
| 5,037,878 A | 8/1991 | Cerles et al. |
| 2005/0038217 A1 | 2/2005 | Ahn et al. |
| 2006/0121300 A1 | 6/2006 | Matsumura |
| 2011/0039087 A1 | 2/2011 | Cauvin et al. |
| 2014/0196396 A1 | 7/2014 | Watts et al. |
| 2017/0009098 A1 | 1/2017 | Huda et al. |
| 2019/0002613 A1* | 1/2019 | Hsu ............................ C08J 3/05 |
| 2020/0048461 A1* | 2/2020 | Kobayashi ............... C09D 7/70 |
| 2020/0283555 A1 | 9/2020 | Hsu et al. |

FOREIGN PATENT DOCUMENTS

| | | | |
|---|---|---|---|
| CN | 109071727 A | 12/2018 | |
| EP | 1972664 A2 | 9/2008 | |
| EP | 3587522 A1 | 1/2020 | |
| IN | 201617034735 A | 2/2017 | |
| JP | 2007502346 A | 2/2007 | |
| WO | 2011100665 A2 | 8/2011 | |
| WO | WO-2017112586 A1 * | 6/2017 | ............... A61K 8/06 |
| WO | WO-2018155203 A1 * | 8/2018 | ............... C08J 5/18 |
| WO | 2021003205 A1 | 1/2021 | |
| WO | 2021003206 A1 | 1/2021 | |

OTHER PUBLICATIONS

International Search Report for PCT/US2020/040401 dated Oct. 20, 2020, 3 pages.
International Search Report for PCT/US2020/040402 dated Oct. 28, 2020, 4 pages.
Nissan Chemical Corporation Inorganic Materials: Products SNOWTEX, retrieved from https://www.nissanchem.co.jp/products/materials/inorganic/eng/products/01/ , 4 pages, Published 2019.

* cited by examiner

*Primary Examiner* — Deve V Hall
(74) *Attorney, Agent, or Firm* — WARNER NORCROSS + JUDD LLP

(57) ABSTRACT

A liquid applied, silicone-based air and water barrier coating composition and its use as a silicone-based air and water barrier is provided. The barrier is generally vapour permeable and suitable for the construction industry. The liquid coating composition generally has a shelf-life of at least 9 months. The liquid coating composition comprises: (i) a crosslinked polysiloxane dispersion comprising (c) a surfactant and (d) water; (ii) a combination of rheology modifiers and at least one of the following ingredients: (iii) one or more fillers and/or (iv) one or more stabilizers.

18 Claims, No Drawings

SILICONE-BASED BARRIER COMPOSITIONS

CROSS-REFERENCE TO RELATED APPLICATIONS

This application is the U.S. National Stage of International Application No. PCT/US2020/040401 filed on 1 Jul. 2020, which claims priority to and all advantages of U.S. Provisional Application No. 62/870,111 filed on 3 Jul. 2019, the contents of which is incorporated herein by reference.

TECHNICAL FIELD

This disclosure relates to a liquid applied, silicone-based air and water barrier composition and its use as a silicone-based air and water barrier, which is preferably vapour permeable, for the construction industry, which liquid applied, silicone-based air and water barrier composition has a shelf-life of greater than or equal to ($\geq$) 9 months.

BACKGROUND

A wide variety of water barrier systems are used in both new building and remedial construction applications. They are designed to eliminate uncontrolled water leakage through e.g. exterior walls and/or facades enabling the control of e.g. temperature, humidity levels, moisture levels and air quality throughout a building thereby minimising, for example, the possibility of damp problems and/or the chance of mold growth and poor air quality.

Water barriers are intended to minimise or exclude the ingress of liquid water into a building through a wall or façade or the like e.g. via capillary action through cracks, holes or porous materials. The application of such barrier systems to constructions, e.g. cavity wall systems, results in energy cost savings especially if the water barriers are also air barriers in which case they may also significantly reduce the ingress of airborne pollutants by substantially reducing the amount of air leakage through the exterior walls or facades of a building. Air barriers reduce air flow through building wall assemblies improving energy efficiency.

A liquid applied, air and water barrier coating composition may also be (water) vapour permeable. A liquid applied, vapour permeable, silicone-based air and water barrier is designed to be (water) vapour permeable i.e. to control the amount of (water) vapour diffusing through a wall due to variable vapour pressures. Unless prevented or controlled, water vapour will naturally move from a high concentration to a lower concentration until it is in balance. Hence, if the vapour pressure is high outside the wall and low inside the wall, vapour will be directed inward (and vice versa).

The use of aqueous based sprayable silicone elastomeric coatings as air barriers for walls and facades or the like in buildings based on silicone waterborne emulsions (SWBEs) are highly desirable in the construction industry (in contrast to solvent borne systems) because they are both VOC (volatile organic compound) free and are non-reactive/non-cure systems. Furthermore, unlike many organic coatings, silicone-based coatings have excellent UV stability. Hence, whereas externally applied organic coatings cannot be exposed to UV radiation for extended periods of time during construction without necessitating re-application of one or more additional coating layer(s) whilst no such requirement is necessary for silicone-based coating compositions. Silicone-based coating compositions may be of much lower viscosity than organics which enables the use of a larger variety of applicators including even standard low-cost commercial paint sprayers to be usable as applicators and the resulting coatings have the significant advantage over organic based coatings of being compatible with other silicone-based materials used in the construction industry such as caulks adhesives, and weather sealants, avoiding the need to apply compatiblising layers of adhesives, primers and/or adhesion promoters and the like at joints between water barriers and said silicone caulks, adhesives and weather sealants.

However, one problem that remains to be solved with liquid applied, air and water barrier coating composition using SWBEs for these applications is shelf life stability, particularly when designed to be coloured or tinted. Increasingly, in recent years architects prefer to use colour tinted coating compositions which dry or cure to colour tinted coatings for reasons of architectural aesthetics. The use of such colour tinted coatings provides improved "hiding" of underlying components of the building with e.g. grey tinted systems being preferred to white as these are less likely to be visible through gaps in the final exterior surface (cladding/siding). However, whilst it would be desirable to use aqueous dispersions of pigments as tinting components rather than powdered pigments at either the manufacturing plant or at point of use due to ease of use previous commercial air barriers based on SWBEs have been either untinted or tinted with powders (leading to difficulties with retail-based tinting). This is because, unfortunately, the aqueous dispersants of pigments and colorants e.g. carbon black are known to have a destabilizing impact on the aforementioned liquid applied, air and water barrier coating compositions leading to rapid loss of shelf-life even in the presence of rheology modifiers, such as, for example, hydrophobically modified alkali swellable emulsions (HASEs) and other associative thickeners, with gelation tending to occur after only 6 months at room temperature resulting in these compositions being considered shelf-life constrained because of the limitations in supply chain options, geographic distribution, production scheduling, and ultimately coating performance.

Rheology modifiers are traditionally used to both control how coating compositions flow when spray or roll/brush applied to achieve uniform coating without sagging and also thicken compositions during storage preventing separation of the components due to gravity driven separation. The hydrophobically modified alkali swellable emulsions (HASEs) may be referred to as associative thickeners as they are water-soluble polymers containing several relatively hydrophobic groups. They are typically acrylate polymers/copolymers containing water-insoluble hydrophobic groups. Other associative thickeners include hydrophobe modified ethoxylated urethanes (HEURs).

A main disadvantage of HASEs has been the strong influence of other ingredients and paint additives towards their thickening capability. It has been known since the introduction of associative thickeners that their thickening efficiency is strongly reduced when solvents like glycols, surfactants and or the previously mentioned dispersants are present in compositions. Especially when the compositions are tinted with pigments by addition of a colorant. By the term colorants we mean concentrates of pigments that contain a large number of wetting agents and glycols to keep the pigments stable in the system and keep the viscosity low. Hydrophobically modified alkali swellable emulsions (HASEs) may be utilised as rheology modifiers in SWBE based liquid applied, air and water barrier coating compositions as well as in many organic systems and are well known for extending shelf-life. Indeed, HASE based materials are so successful in acrylic paints as rheology modifiers that the ultimate shelf life of acrylic paints is often a decade or more (in a well-sealed container to prevent water loss), and is determined by other failure mechanisms, such as bacterial growth or failure of the container seal. In contrast despite the use of HASEs as rheology modifiers, SWBE based materials, especially if containing aqueous dispersions of pigments as tinting components, will gel over a short time i.e. about 6 months and contrary to expectations the addition of large amounts of HASE accelerates gelation rather than having a stabilising effect.

SUMMARY OF INVENTION

It has been surprisingly identified that a one-component cross-linked polysiloxane dispersion composition may be used as a liquid applied, air and water barrier coating composition for application to internal wall assemblies and the shelf life thereof can be extended to greater than or equal to (≥) 9 months by restricting the levels of HASE materials present to between 0.05-0.36 wt. % of the composition.

There is provided herein a liquid applied, air and water barrier coating composition comprising:
(i) a crosslinked polysiloxane dispersion of: a reaction product of (a) a siloxane polymer having at least two —OH groups per molecule, or polymer mixture having at least two —OH groups per molecule, having a viscosity of between 5000 to 500,000 mPa·s at 21° C. and (b) at least one self-catalyzing crosslinker reactive with (a), and additionally comprising (c) a surfactant and (d) water;
(ii) a combination of rheology modifiers in an amount of from 0.25 to 5 wt. % of the composition, comprising or consisting of one or more hydrophobically modified alkali swellable emulsions in an amount of 0.05-0.36 wt. % of the composition and one or more other rheology modifiers; and
at least one of the following ingredients:
(iii) one or more fillers selected from the group of colloidal silica, fumed silica, precipitated silica, diatomaceous earth, ground quartz, kaolin, calcined kaolin, wollastonite, hydroxyapatite, calcium carbonate, hydrated alumina, magnesium hydroxide, carbon black, titanium dioxide, aluminium oxide, vermiculite, zinc oxide, mica, talcum, iron oxide, barium sulphate and slaked lime or a mixture thereof; and/or
(iv) one or more stabilizers. The liquid applied, air and water barrier coating composition is preferably (water) vapour permeable, when a dried coating on a substrate and alternatively is (water) vapour permeable, when a dried coating on a substrate.

There is also provided herein a wall assembly having an internal side and an external side, wherein either or both said internal side and said external side is coated with a dried coating of the liquid applied, air and water barrier coating composition hereinbefore described. The dried coating is preferably (water) vapour permeable, alternatively the dried coating is (water) vapour permeable.

There is also provided herein a method for increasing the shelf stability of a liquid applied, air and water barrier coating composition by introducing (ii) a combination of rheology modifiers in an amount of from 0.25 to 5 wt. % of the composition, comprising or consisting of one or more hydrophobically modified alkali swellable emulsions in an amount of 0.05-0.36 wt. % of the composition and one or more other rheology modifiers; into a liquid applied, air and water barrier coating composition otherwise comprising (i) a crosslinked polysiloxane dispersion of: a reaction product of (a) a siloxane polymer having at least two —OH groups per molecule, or polymer mixture having at least two —OH groups per molecule, having a viscosity of between 5000 to 500,000 mPa·s at 21° C., and (b) at least one self-catalysing crosslinker reactive with (a), and additionally comprising (c) a surfactant and (d) water;
and at least one of the following ingredients:
(iii) one or more fillers selected from the group of colloidal silica, fumed silica, precipitated silica, diatomaceous earths, ground quartz, kaolin, calcined kaolin, wollastonite, hydroxyapatite, calcium carbonate, hydrated alumina, magnesium hydroxide, carbon black, titanium dioxide, aluminium oxide, vermiculite, zinc oxide, mica, talcum, iron oxide, barium sulphate and slaked lime or a mixture thereof; and/or
(iv) one or more stabilizers.

There is also provided herein a use of a combination of rheology modifiers in an amount of from 0.25 to 5 wt. % of the composition, comprising or consisting of one or more hydrophobically modified alkali swellable emulsions in an amount of 0.05-0.36 wt. % of the composition and one or more other rheology modifiers; for increasing the shelf stability of a liquid applied, air and water barrier coating composition otherwise comprising
(i) a crosslinked polysiloxane dispersion of: a reaction product of (a) a siloxane polymer having at least two —OH groups per molecule, or polymer mixture having at least two —OH groups per molecule, having a viscosity of between 5000 to 500,000 mPa·s at 21° C., and (b) at least one self-catalysing crosslinker reactive with (a), and additionally comprising (c) a surfactant and (d) water; and at least one of the following ingredients:
(iii) one or more fillers selected from the group of colloidal silica, fumed silica, precipitated silica, diatomaceous earths, ground quartz, kaolin, calcined kaolin, wollastonite, hydroxyapatite, calcium carbonate, hydrated alumina, magnesium hydroxide, carbon black, titanium dioxide, aluminium oxide, vermiculite, zinc oxide, mica, talcum, iron oxide, barium sulphate and slaked lime or a mixture thereof; and/or
(iv) one or more stabilizers.

DESCRIPTION

This disclosure relates to a silicone water borne emulsion (hereafter referred to as "SWBE") based liquid applied, air and water barrier coating composition having a shelf-life of greater than or equal to (≥) 9 months. The extended shelf-life is achieved using a specific combination of rheology modifying ingredients. It has been unexpectedly found that when hydrophobically modified alkali swellable emulsions (HASEs) are used, in a specific range, in combination with other rheology modifiers, in a SWBE based liquid applied, air and water barrier coating composition, said SWBE based liquid applied, air and water barrier coating composition has a shelf-life of ≥9 months which is a significant extension to the typical previous shelf life of up to about 6 months. It has surprisingly been found that whilst it is preferred to have one or more HASEs present in a SWBE based liquid applied, vapour permeable, air and water barrier coating composition to achieve the rheology profile necessary for application as a coating, the introduction of significant amounts of HASE in a SWBE appears to have a negative effect on its shelf-life unlike when used in other emulsion formulations.

The improved shelf life is potentially commercially significant given the previously discussed industry desire to use pigmented (sometimes referred to as "tinted") coatings to improve architectural aesthetics as it provides a means of increasing the shelf life of the SWBE based liquid applied, vapour permeable, air and water barrier coating composition, even when tinted, to greater than the previously limited approximately 6 month duration, thereby removing at least some of the constraints and limitations on supply chain options, geographic distribution, production scheduling, and ultimately coating performance and providing a solution which seems counterintuitive by limiting the levels of HASE present.

The SWBE-based liquid applied, vapour permeable, air and water barrier coating composition utilizing the limited HASE presence has shelf-life stability which corresponds to greater than or equal to (≥) 9 months, alternatively ≥12 months at room temperature and thereby provides:
1) effective stabilization of the formulations for ≥9 months, alternatively ≥12 months,
2) the opportunity for point of sale tinting with aqueous dispersions,
3) the opportunity for point of manufacture tinting with aqueous dispersions; whilst maintaining its air and water barrier properties.

The liquid applied, vapour permeable, air and water barrier coating composition comprises
(i) a crosslinked polysiloxane dispersion of: a reaction product of (a) a siloxane polymer having at least two —OH groups per molecule, or polymer mixture having at least two —OH groups per molecule, having a viscosity of between 5000 to 500,000 mPa·s at 21° C., and (b) at least one self-catalyzing crosslinker reactive with (a), and additionally comprising (c) a surfactant and (d) water.

The siloxane polymers or polymer mixtures (a) used as starting materials for the reaction product (i) above have a viscosity between 5,000 to 500,000 mPa·s. at 21° C. using a recording Brookfield viscometer with Spindle 3 at 2 rpm according to ASTM D4287-00(2010). The siloxane polymers are described by the following molecular Formula (1)

$$X_{3-n}R_n\text{-}YO\text{-}(R^1{}_2SiO)_z\text{-}Y\text{-}R_nX_{3-n} \qquad (1)$$

where n is 0, 1, 2 or 3, z is an integer from 500 to 5000 inclusive, X is a hydrogen atom, a hydroxyl group and any condensable or any hydrolyzable group, Y is a Si atom or an Si-$(CH_2)_m$-Si$R^1{}_2$ group, R is individually selected from the group consisting of aliphatic, alkyl, aminoalkyl, polyaminoalkyl, epoxyalkyl, alkenyl or aromatic aryl groups and $R^1$ is individually selected from the group consisting of X, aliphatic, alkyl, alkenyl and aromatic groups; and m is an integer between 1 and 12 inclusive, alternatively between 1 and 10 inclusive, alternatively between 1 and 6 inclusive.

The siloxane polymer (a) can be a single siloxane represented by Formula (1) or it can be mixtures of siloxanes represented by the aforesaid formula or solvent/polymer mixtures. The term "polymer mixture" is meant to include any of these types of polymers or mixtures of polymers. As used herein, the term "silicone content" means the total amount of silicone in the dispersed phase of the dispersion, from whatever source, including, but not limited to the silicone polymer, polymer mixtures, self-catalytic crosslinkers and, if present in-situ resin reinforcers and stabilizers.

Each X group may be the same or different and can be a hydrogen atom, hydroxyl group and any condensable or hydrolyzable group. The term "hydrolyzable group" means any group attached to the silicon which is hydrolyzed by water at room temperature. The hydrolyzable group X includes hydrogen atom, halogen atoms, such as F, Cl, Br or I; groups of the Formula —OT, where T is any hydrocarbon or halogenated hydrocarbon group, such as methyl, ethyl, isopropyl, octadecyl, allyl, hexenyl, cyclohexyl, phenyl, benzyl, beta-phenylethyl; any hydrocarbon ether radical, such as 2-methoxyethyl, 2-ethoxyisopropyl, 2-butoxyisobutyl, p-methoxyphenyl or —$(CH_2CH_2O)_2CH_3$; or any N,N-amino radical, such as dimethylamino, diethylamino, ethylmethylamino, diphenylamino or dicyclohexylamino X can also be any amino radical, such as $NH_2$, dimethylamino, diethylamino, methylphenylamino or dicyclohexylamino; any ketoxime radical of the formula —ON=$CM_2$ or —ON=CM' in which M is any monovalent hydrocarbon or halogenated hydrocarbon radical, such as those shown for T above and M' is any divalent hydrocarbon radical, both valences of which are attached to the carbon, such as hexylene, pentylene or octylene; ureido groups of the formula —N(M)CONM"$_2$ in which M is defined above and M" is hydrogen atom or any of the above M radicals; carboxyl groups of the formula —OOCMM" in which M and M" are defined above or carboxylic amide radicals of the formula —NMC=O(M") in which M and M" are defined above. X can also be the sulphate group or sulphate ester groups of the formula —$OSO_2$(OM), where M is as defined above; the cyano group; the isocyanate group; and the phosphate group or phosphate ester groups of the formula —$OPO(OM)_2$ in which M is defined above.

The most preferred X groups are hydroxyl groups or alkoxy groups. Illustrative alkoxy groups are methoxy, ethoxy, propoxy, butoxy, isobutoxy, pentoxy, hexoxy and 2-ethylhexoxy; dialkoxy radicals, such as methoxymethoxy or ethoxymethoxy and alkoxyaryloxy, such as ethoxyphenoxy. The most preferred alkoxy groups are methoxy or ethoxy.

R is individually selected from the group consisting of aliphatic, alkyl, aminoalkyl, polyaminoalkyl, epoxyalkyl, alkenyl organic and aromatic aryl groups. Most preferred are the methyl, ethyl, octyl, vinyl, allyl and phenyl groups.

$R^1$ is individually selected from the group consisting of X, aliphatic, alkyl, alkenyl and aromatic aryl groups. Most preferred are methyl, ethyl, octyl, trifluoropropyl, vinyl and phenyl groups.

When the siloxane polymer of formula (1) has an average of more than two condensable or hydrolyzable groups per molecule which are self-catalytic (or which may alternatively, perhaps be referred to as self-activating) it is not necessary to have the self-catalytic crosslinker present separately to form a crosslinked polymer. The condensable or hydrolyzable groups on the different siloxane molecules can react with each other to form the required crosslinks.

The siloxane polymer (a) can be a mixture of different kinds of molecules, for example, long chain linear molecules and short chain linear or branched molecules. These molecules may react with each other to form a crosslinked network. Such siloxanes, which can take the place of more conventional crosslinkers, are illustrated by low molecular weight organosilicon hydrides, such as polymethylhydrogensiloxane, low molecular weight copolymers containing methylhydrogensiloxy and dimethylsiloxy groups, —(OSi(OEt)$_2$)—, (ethylpolysilicate), (OSiMe$C_2H_4$Si(OMe)$_3$)$_4$ and (OSi-MeON=CR'$_2$)$_4$, where Me is methyl and Et is ethyl.

Advantageously, the siloxane polymer (a) also comprises mixtures of siloxane polymers of formula (1), exemplified by, but not limited to, mixtures of α,ω-hydroxysiloxy terminated siloxanes and of α,ω-bis(triorganosiloxy) terminated siloxanes, mixtures of α,ω-hydroxylsiloxy terminated siloxanes and of α-hydroxy, ω-triorganosiloxy terminated siloxanes, mixtures of α,ω-dialkoxysiloxy terminated siloxanes and of α,ω-bis(tri-organosiloxy) terminated siloxanes, mixtures of α,ω-dialkoxysiloxy terminated siloxanes and of α,ω-hydroxysiloxy terminated siloxanes, mixtures of α,ω-hydroxysiloxy terminated siloxanes and of α,ω-bis(triorganosiloxy) terminated poly(diorgano)(hydrogenorgano)siloxane copolymers. The siloxane polymer as hereinbefore described can also comprise mixtures of siloxane polymers of formula (1) as described above with liquid, branched methylpolysiloxane polymers ("MDT fluids") comprising a combination of recurring units of the formulae:

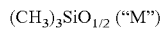(CH$_3$)$_3$SiO$_{1/2}$ ("M")

(CH$_3$)$_2$SiO ("D")

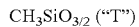CH$_3$SiO$_{3/2}$ ("T")

and containing from 0.1 to 8% hydroxyl groups. The fluids may be prepared by co-hydrolysis of the corresponding chloro- or alkoxy-silanes, as described, for example, in U.S. Pat. No. 3,382,205. The proportion of MDT fluids added should not exceed 50 parts, preferably of 1 to 20 parts by weight, per 100 parts by weight of the polymer of Formula (1), to achieve improved physical properties and adhesion of the resultant polymers. The siloxane polymer in the composition as hereinbefore described can also comprise mixtures of siloxane polymers of Formula (1) with liquid or solid, branched methylsiloxane polymeric resins comprising a combination of recurring units of the formulae:

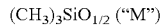(CH$_3$)$_3$SiO$_{1/2}$ ("M")

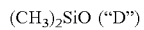(CH$_3$)$_2$SiO ("D")

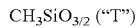CH$_3$SiO$_{3/2}$ ("T")

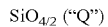SiO$_{4/2}$ ("Q")

and containing from 0.1 to 8% hydroxyl groups, the fluids may be prepared by co-hydrolysis of the corresponding chloro- or alkoxy-silanes, as described, for example in U.S. Pat. No. 2,676,182. The MDTQ fluid/resin may be added in a proportion not exceeding 50 parts, preferably of 1 to 10 parts by weight, per 100 parts by weight of the polymer of Formula (1) to improve physical properties and adhesion of the resultant polymers. MDTQ fluids/resins can also be mixed with MDT fluids and the polymers of Formula (1).

The at least one self-catalytic crosslinker (b) reactive with (a) to form reaction product (i) is present in the amount of 1 to 5 parts by weight per 100 parts of siloxane polymer. The term "self-catalytic crosslinker" is well known and means a molecule that has at least one group serving as the catalytic species (or activating species). Hence, an alternative name for such a cross-linker might be a "self-activating cross-linker", if preferred. For example, a molecule that has at least one functional group that reduces the energy activation level necessary for an e.g. hydroxyl functional groups on a siloxane polymer to condense forming a cross linked polymer.

While in certain circumstances only one self-catalytic crosslinker may be needed to produce an elastomer having the desired physical properties, those skilled in the art will recognize that two or more self-catalytic crosslinkers may be added to the reaction mixture to achieve excellent results. In addition, the self-catalytic crosslinker or crosslinkers may be added with a conventional catalyst. However, adding the self-catalytic crosslinker with a conventional catalyst is not required and the compositions contemplated herein may in fact be free of said conventional catalysts.

Typical self-catalytic crosslinkers (or alternatively self-activating cross-linkers) include tri or tetra functional compounds, such as R—Si-(Q)$_3$ or Si-(Q)$_4$, where Q is carboxylic, OC(O)R$^4$, e.g., acetoxy and R$^4$ is an alkyl group of 1 to 8 carbon atoms inclusive, preferably methyl, ethyl or vinyl. Other preferred Q groups are the hydroxyl amines, ON(R$^4$)$_2$, where each R$^4$ is the same or different alkyl group of 1 to 8 carbon atoms inclusive, e.g., ON(CH$_2$CH$_3$)$_2$. Q may also be an oxime group, such as O—N=C(R$^4$)$_2$, where each R$^4$ is the same or different alkyl group of 1 to 8 carbon atoms inclusive, e.g., O—N=C(CH$_3$)(CH$_2$CH$_3$). Further, Q may be an amine group, such as N(R$^5$)$_2$, where R$^5$ is the same or different alkyl group of 1 to 8 carbon atoms inclusive or cyclic alkyl group, e.g., N(CH$_3$)$_2$ or NH(cyclohexyl). Finally, Q may be an acetamido group, NRC(O)R$^4$, where R$^4$ is an alkyl group of 1 to 8 carbon atoms inclusive, e.g. N(CH$_3$)C(O)CH$_3$.

In addition, partial hydrolysis products of the aforementioned compounds may also function as self-catalytic crosslinkers. This would include dimers, trimers, tetramers and the like, for example, compounds of the formula:

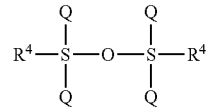

where Q and R$^4$ are defined in the preceding paragraph.

Also useful as self-catalytic crosslinkers are those polymeric or copolymeric species containing 3 or more (Q) sites located at either pendant or terminal positions or both on the backbone of a polydiorganosiloxane molecule. Examples of the pendent group include compositions of the following formula:

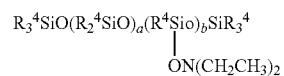

where R$^4$ is as defined above and a is 0 or a positive integer and b is an integer greater than 2. In general, polymeric compositions having either pendent or terminal Q groups may be used, in particular, compounds of the formula:

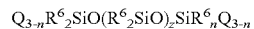

where n is 0, 1, 2 or 3, z is a positive integer, R$^6$ is Q or independently the same or different alkyl chain of 1 to 8 carbon atoms inclusive if there are at least three Q groups on the molecule. Q is as described above.

Effective self-catalytic crosslinkers (for which an alternative name may be self-activating cross-linkers) are those compounds which form tack free elastomers when mixed with functional silicone polymers in the absence of additional catalysts such as tin carboxylates or amines. In the self-catalytic crosslinkers, the acetoxy, oxime, hydroxyl amine (aminoxy), acetamide and amide groups catalyze the formation of Si—O—Si bonds in the reactions contemplated.

One skilled in the art would recognize that the starting polymer itself could be pre-endblocked with self-catalytic crosslinking moieties. Optionally, further self-catalytic crosslinkers can be added to such compositions.

The surfactant (c) may be selected from nonionic surfactants, cationic surfactants, anionic surfactants, amphoteric surfactants or mixtures thereof. The surfactant (c) is present in our composition in an amount of 0.5 to 10 parts by weight of siloxane polymer (a) and is preferably present in the amount of 2 to 10 parts.

Most preferred are nonionic surfactants known in the art as being useful in emulsification of polysiloxanes. Useful nonionic surfactants are polyoxyalkylene alkyl ethers, polyoxyalkylene sorbitan esters, polyoxyalkylene esters, polyoxyalkylene alkylphenyl ethers, ethoxylated amides and others. The surfactants useful herein may be further exemplified by TERGITOL® TMN-6, TERGITOL® 15S40, TERGITOL® 15S9, TERGITOL® 15S12, TERGITOL® 15S15 and TERGITOL® 15S20, and TRITON® X405 produced by The Dow Chemical Company of Midland, Michigan; BRIJ® 30 and BRIJ® 35 produced by Croda (UK); MAKON® 10 produced by STEPAN COMPANY, (Chicago, IL); and ETHOMID® O/17 produced by Akzo Nobel Surfactants (Chicago, IL). Specific non-ionic surfactants include ethoxylated alcohols, ethoxylated esters, polysorbate esters, ethoxylated amides; polyoxypropylene compounds, such as propoxylated alcohols, ethoxylated/propoxylated block polymers and propoxylated esters; alkanolamides; amine oxides; fatty acid esters of polyhydric alcohols, such as ethylene glycol esters, diethylene glycol esters, propylene glycol esters, glyceryl esters, polyglyceryl fatty acid esters, sorbitan esters, sucrose esters and glucose esters.

Cationic and anionic surfactants known in the art as being useful in emulsification of polysiloxanes are also useful as the surfactant herein. Suitable cationic surfactants are aliphatic fatty amines and their derivatives, such as dodecylamine acetate, octadecylamine acetate and acetates of the amines of tallow fatty acids; homologues of aromatic amines having fatty chains, such as dodecylanalin; fatty amides derived from aliphatic diamines, such as undecylimidazoline; fatty amides derived from disubstituted amines, such as oleylaminodiethylamine; derivatives of ethylene diamine; quaternary ammonium compounds, such as tallow trimethyl ammonium chloride, dioctadecyldimethyl ammonium chloride, didodecyldimethyl ammonium chloride and dihexadecyldimethyl ammonium chloride; amide derivatives of amino alcohols, such as beta-hydroxyethylstearyl amide; amine salts of long chain fatty acids; quaternary ammonium bases derived from fatty amides of di-substituted diamines, such as oleylbenzylaminoethylene diethylamine hydrochloride; quaternary ammonium bases of the benzimidazolines, such as methylheptadecyl benzimidazole hydrobromide; basic compounds of pyridinium and its derivatives, such as cetylpyridinium chloride; sulfonium compounds, such as octadecylsulfonium methyl sulphate; quaternary ammonium compounds of betaine, such as betaine compounds of diethylamino acetic acid and octadecylchloromethyl ether; urethanes of ethylene diamine, such as the condensation products of stearic acid and diethylene triamine; polyethylene diamines and polypropanolpolyethanol amines Cationic surfactants commercially available and useful herein include ARQUAD® T27W, ARQUAD® 16-29, ARQUAD® C-33, ARQUAD® T50, ETHOQUAD® T/13 ACETATE, all manufactured by Akzo Nobel Surfactants (Chicago, IL).

Suitable anionic surfactants are carboxylic, phosphoric and sulfonic acids and their salt derivatives. The anionic surfactants may include alkyl carboxylates; acyl lactylates; alkyl ether carboxylates; n-acyl sarcosinate; n-acyl glutamates; fatty acid-polypeptide condensates; alkali metal sulforicinates; sulfonated glycerol esters of fatty acids, such as sulfonated monoglycerides of coconut oil acids; salts of sulfonated monovalent alcohol esters, such as sodium oleylisethionate; amides of amino sulfonic acids, such as the sodium salt of oleyl methyl tauride; sulfonated products of fatty acids nitriles, such as palmitonitrile sulfonate; sulfonated aromatic hydrocarbons, such as sodium alpha-naphthalene monosulfonate; condensation products of naphthalene sulfonic acids with formaldehyde; sodium octahydroanthracene sulfonate; alkali metal alkyl sulphates, ether sulphates having alkyl groups of 8 or more carbon atoms and alkylarylsulfonates having 1 or more alkyl groups of 8 or more carbon atoms.

Anionic surfactants commercially available and useful herein include POLYSTEP® A4, A7, A11, A15, A15-30K, A16, A16-22, A18, A13, A17, B1, B3, B5, B11, B12, B19, B20, B22, B23, B24, B25, B27, B29, C-OP3S; ALPHA-STEP® ML40, MC48; STEPANOL(TM) MG; all produced by STEPAN CO., Chicago, IL; HOSTAPUR® SAS produced by HOECHST CELANESE; HAMPOSYL® C30 and L30 produced by W.R.GRACE & CO., Lexington, MA.

Suitable amphoteric surfactants are glycinates, betaines, sultaines and alkyl aminopropinates. These include cocoamphglycinate, cocoamphocarboxy-glycinates, cocoamidopropylbetaine, lauryl betaine, cocoamidopropylhydroxysultaine, laurylsulataine and cocoamphodipropionate.

Amphoteric surfactants commercially available and useful herein are REWOTERIC® AM TEG, AM DLM-35, AM B14 LS, AM CAS and AM LP produced by SHEREX CHEMICAL CO., Dublin, OH.

Specific silicone surfactants which improve high temperature stability include branched or linear polyoxyalkylenes. Specific fluorosurfactants include those selected from anionics (such as carboxylates and sulfonics), non-ionics and amphoterics.

The selection of the surfactant also influences the clarity of the elastomeric film resulting from the evaporation of water from the dispersion. To obtain clear elastomers from silicone lattices, the refractive index must be matched in the final film between the crosslinked siloxane phase and the surfactant/residual water phase. The term "crosslinked siloxane phase" refers to the plurality of crosslinked siloxane particles remaining after water has evaporated to form an elastomeric film. The term "surfactant/residual water phase" refers to amount of residual surfactant and water remaining in the elastomeric film after the evaporation of substantially all the water from the dispersion.

In addition to adding the surfactant to the siloxane polymer, the mixture also includes a predetermined amount of water. The water is present in the mixture in an amount of 0.5 to 30 parts by weight of siloxane polymer and is preferably present in the amount of 2 to 10 parts. Water may also be added after mixing, in any amount, to dilute the gel phase.

The reaction product (i) may additionally comprise one or more additives such as in-situ resin reinforcers such as methyltrimethoxy silane, vinyltrimethoxy silane, tetraethyl orthosilicate (TEOS), normal propylorthosilicate (NPOS) may be added with the self catalyzing crosslinker. It is believed that adding in situ resin reinforcers to the polydiorganosiloxane/self-catalytic crosslinker mixture forms an in-situ resin having a highly branched and crosslinked structure, which results in improved physical properties of the elastomer, particularly the tensile, elongation and hardness properties. It also results in improved clarity of the resulting elastomer.

The reaction product (i) is produced by mixing the above components at a sufficiently high shear to transform the mixture into a gel phase and by then diluting the gel with water to the desired silicone content.

The reaction product of (a) a siloxane polymer having at least two —OH groups per molecule, or polymer mixture having at least two —OH groups per molecule, having a viscosity of between 5,000 to 500,000 mPa·s at 21° C., and (b) at least one self-catalysing crosslinker reactive with (a), additionally comprising (c) a surfactant and (d) water; typically comprises, excluding additives (i.e. on the basis that the (product of (a)+(b))+(c)+(d) is 100% by weight), 70 to 90% by weight of the reaction product of (a)+(b), 3 to 10% by weight of (c) and 7 to 20% by weight of component (d). Alternatively, excluding additives (i.e. on the basis that the (product of (a)+(b)+(c)+(d) is 100% by weight), 80 to 90% by weight of the reaction product of (a)+(b), 3 to 8% by weight of (c) and 7 to 15% by weight of component (d). The cross-linked polysiloxane dispersion composition will typically comprise from 30 to 80 wt. %, alternatively 30 to 60 wt. %, alternatively 35 to 50 wt. % of reaction product (i) as hereinbefore described.

The SWBE-based liquid applied, air and water barrier coating composition herein also comprises component (ii) a combination of rheology modifiers in an amount of from 0.25 to 5 wt. % of the composition, comprising or consisting of one or more hydrophobically modified alkali swellable emulsions (HASEs) in an amount of 0.05-0.36 wt. % of the composition, alternatively in an amount of from 0.1 to 0.36 wt. % of the composition and one or more other rheology modifiers.

HASE polymers are commercially important as associative thickener type rheology modifiers in aqueous paints and coatings. They are dispersions of water-insoluble acrylic polymers in water which may be rendered water soluble by neutralizing acid groups on the polymer chain and also contain long-chain hydrophobic groups, sometimes referred to as "hydrophobes". Typically, they are aqueous dispersion of copolymers of
 (i) acylate ester or methacrylate ester monomers such as methyl methacrylate ethyl acrylate, butyl acrylate, or ethylhexyl acrylate);
 (ii) methacrylic acid, acrylic acid, or itaconic acid; and
 (iii) monomers containing long chain hydrophobic groups such as an ethylenically unsaturated polyethylene oxide (polyEO) macromonomer, e.g. an alkylated ethoxylate monomer, preferably an alkylated ethoxylate acrylate or methacrylate.
The alkylated chains may be in the range of C10 to C25, alternatively C12 to C20.

For example, the following commercially available HASEs from the Dow Chemical Company contain polymerized units of ethyl acrylate and methacrylic acid monomers with hydrophobes attached, ACRYSOL™ DR-6600, ACRYSOL™ DR-5500, ACRYSOL™ RM-7 ACRYSOL™ TT-615, ACRYSOL™ DR-72 and ACRYSOL™ TT-935 . Other commercially available HASEs include ACRYSOL™ Primal HT-400, ACULYN™ 88, ACULYN™28, ACULYNL™ 88 and Romax 7011 from the Dow Chemical Company, RHEOTECH™ 4800 from Coatex.

The remainder of the combination of rheology modifiers may include any associative thickener other than HASE materials, for examples hydrophobe modified ethoxylated urethanes (HEURs). Hydrophobe modified ethoxylated urethanes (HEURs) associative thickener type rheology modifiers are widely used in waterborne coatings for their desirable rheological and application properties. The hydrophobically modified alkylene oxide urethane polymer is a polyethylene oxide, polypropylene oxide, or polybutylene oxide urethane polymer, preferably a polyethylene oxide urethane polymer modified with suitable the hydrophobes and may be prepared by e.g. reacting a diisocyanate; a water soluble polyalkylene glycol; and a capping agent comprising the hydrophobe. The hydrophobes are then introduced by end-capping this isocyanate terminated prepolymer with e.g. hydrophobic alcohols or amines.

Other rheology modifiers which may be utilised include for the sake of example, hydroxyethyl celluloses (HECs), alkali swellable emulsions (ASEs), suitable styrene-maleic anhydride terpolymers (SMATs) as well e.g. natural and modified natural materials, such as, for example starch, modified starch, proteins, and modified proteins, dimeric and trimeric fatty acids and/or imidazolines.

ASE-thickeners are similar in polymer structure to HASE thickeners but do not contain the hydrophobe groupings, i.e. they are dispersions of insoluble acrylic polymers in water which have a high percentage of acid groups distributed throughout their polymer chains. When the acid groups are neutralized, the salt that is formed is 'hydrated' the salt either swells in aqueous solutions or becomes completely water soluble. As the concentration of neutralized polymer in an aqueous formulation increases, the swollen polymer chains start to overlap, until they 'tangle up'. It is this overlapping and tangling that causes viscosity to increase. Again, the concentration of acid groups, the molecular weight and degree of crosslinking of the polymer are important in determining rheology and thickening efficiency. Examples include ACRYSOL™ ASE-75 from Dow.

Hydroxyethyl cellulose polymers (HEC) are nonionic, water-soluble polymer that can thicken, suspend, bind, emulsify, form films, stabilize, disperse, retain water, and provide protective colloid action. They are readily soluble in hot or cold water and can be used to prepare solutions with a wide range of viscosities. Examples include Natrosol® 250 HBR.

They may be present in an amount of from 0.2 to 4.95 weight % of the composition providing the combination of HASE and the other rheology modifiers is present in a cumulative total of from 0.25 to 5 wt. % of the composition, alternatively in an amount of from 0.5 to 3 wt. % of the composition, alternatively in an amount of from 0.5 to 2.0 wt. % of the composition.

In addition to the crosslinked polysiloxane dispersion (i) and the combination of rheology modifiers (ii) the composition comprises at least one of the following ingredients: (iii) one or more fillers selected from the group of colloidal silica, fumed silica, precipitated silica, diatomaceous earths, ground quartz, kaolin, calcined kaolin, wollastonite, hydroxyapatite, calcium carbonate, hydrated alumina, magnesium hydroxide, carbon black, titanium dioxide, aluminium oxide, vermiculite, zinc oxide, mica, talcum, iron oxide, barium sulphate and slaked lime or a mixture thereof; and (iv) one or more stabilizers.

The liquid applied, air and water barrier coating composition may also comprise one or more fillers. Suitable fillers include, for the sake of example, colloidal silica, silica powders made by combustion (fumed silica) and precipitation (precipitated silica), semi-reinforcing agents, such as diatomaceous earths or ground quartz. Nonsiliceous fillers may also be added, such as, calcium carbonate, hydrated alumina, magnesium hydroxide, carbon black, titanium dioxide, aluminium oxide, vermiculite, zinc oxide, mica, talcum, iron oxide, barium sulphate, slaked lime, kaolin, calcined kaolin, wollastonite, and hydroxyapatite.

Other fillers which might be used alone or in addition to the above, include aluminite, calcium sulphate (anhydrite), gypsum, calcium sulphate, magnesium carbonate, clays such as aluminium trihydroxide, graphite, copper carbonate, e.g., malachite, nickel carbonate, e.g., zarachite, barium carbonate, e.g., witherite and/or strontium carbonate, e.g., strontianite; aluminium oxide, silicates from the group consisting of olivine group; garnet group; aluminosilicates; ring silicates; chain silicates; and sheet silicates. The olivine group comprises silicate minerals, such as, but not limited to, forsterite and $Mg_2SiO_4$. The garnet group comprises ground silicate minerals, such as, but not limited to, pyrope; $Mg_3Al_2Si_3O_{12}$; grossular; and $Ca_2Al_2Si_3O_{12}$. Aluminosilicates comprise ground silicate minerals, such as, but not limited to, sillimanite; $Al_2SiO_5$; mullite; $3Al_2O_3 2SiO_2$; kyanite; and $Al_2SiO_5$. The ring silicates group comprises silicate minerals, such as but not limited to, cordierite and $Al_3(Mg,Fe)_2[Si_4AlO_{18}]$. If necessary, liquid alkoxysilanes which are soluble in the siloxane polymer (a) may also be added with the filler to compatibilise the filler with the siloxane polymers.

The selection and addition of particular fillers to our compositions, such as certain types of silicas, may improve the physical properties of the resulting elastomer, particularly tensile properties, elongation properties, hardness and heat stability.

Typically the filler(s), when present are present in an amount of from 10 to 200 weight parts of filler per 100 wt. parts of siloxane polymer (a), alternatively from 15 to 100 weight parts of filler per 100 wt. parts of siloxane polymer (a). Hydrophobing agents may be provided to treat the aforementioned filler(s) to render them hydrophobic and therefore more easily mixed with reaction product (i) the hydrophobing agents may be for example silanes, e.g., alkoxy silanes, silazanes and or short chain (2-20) organopolysiloxanes or alternatively stearates or the like.

Elastomers containing ammonium stabilized silicas are heat stable, while sodium stabilized silicas are not. Acidic silicas, (those containing $H^+$ as a stabilizer) also yield heat stable elastomers. In general, colloidal or dispersed silica which is not stabilized by Group IA or IIA elements of the periodic chart, will also yield heat stable elastomers. Volatile organic amines and volatile inorganic bases are useful as stabilizers for silicas that would yield heat stable elastomers, e.g., $(R^7)_{3-x}N(H)_x$, where x=0, 1, 2 or 3, $R^7$ is an alkyl or aryl group, such as $(CH_3)_2NH$ or $R^7$ is an alcohol group, such as $N(CH_2CH_2OH)_3$ or $NH(CH_2CH_2OH)_2$. The volatile organic amines include cyclohexylamine, triethylamine, dimethylaminomethylpropanol, diethylaminoethanol, aminomethyl propanol, aminobutanol, monoethanolamine, monoisopropanolamine, dimethylethanolamine, diethanolamine, aminoethylpropanediol, aminomethylpropanesiol, diisopropanolamine, morpholine, tris(hydroxymethyl)aminomethane, triisoproanolamine, triethanolamine, aniline and urea. In addition to the volatile organic amines, volatile inorganic bases, such as ammonia and ammonium carbonate, also yield heat stable elastomers.

Stabilizers may also be added to the composition. These may comprise any suitable stabilizer, for example a pH stabilizer or any aminosilane containing polymeric or neat aminosilane will function as a stabilizer. Neat aminosilanes include compounds of the formula

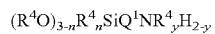

where n and y are independently 0, 1 or 2; $R^4$ is the same or different alkyl chain of 1 to 8 carbon atoms inclusive, $Q^1$ is $(CH_2)_z$ or $\{(CH_2)_zN(R^4))\}_w$, where z is an integer from 1 to 10 and w is from 0 to 3 inclusive.

Polymeric amino silanes may also be used herein, such as reaction products of silanol functional siloxane fluids and aminosilanes or silanol functional siloxane fluids and alkoxysilanes and aminosilanes. For example, one useful polymeric amino siloxane particularly useful has the formula:

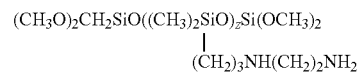

where z is from 3 to 40.

The liquid applied, air and water barrier coating composition according to the present disclosure may further include one or more of the following additives: solvents; pigments/colorants, defoamers; preservatives, such as biocides, mildewcides, fungicides, algaecides, and combinations thereof; buffers, fire retardants, coalescents, disinfectants, corrosion inhibitors, antioxidants, antifoams and biocides flow agents; leveling agents; antifreeze materials, such as polypropylene glycol and additional neutralizing agents, such as hydroxides, amines, ammonia, and carbonates.

It is envisaged to have the opportunity to provide colour tinted liquid applied, air and water barrier coating composition s which dry or cure to colour tinted coatings for reasons of architectural aesthetics so that such colour tinted coatings provides improved "hiding" of underlying components of the building. The shelf-life increase caused by using the rheology modifier combinations described herein circumnavigate previous limitations in supply chain options, geographic distribution, production scheduling, and ultimately coating performance.

The liquid applied, air and water barrier coating compositions as described herein may therefore also include colorants containing coloured pigments that provide tint to the compositions. The pigment particles contained in the formulation are white and non-white pigments. The colorant particles provide any colour including white to the compositions herein. Colorant particles include coloured pigments, white pigments, black pigments, metal effect pigments, and luminescent pigments such as fluorescent pigments and phosphorescent pigments. The term "colorant particles", as used herein includes white pigment particles such as titanium dioxide, zinc oxide, lead oxide, zinc sulfide, lithophone, zirconium oxide, and antimony oxide. Examples of colours for the pigmented polymer composition include black, magenta, yellow, and cyan, as well as combinations of these colours such as orange, blue, red, pink, green, and brown. Other suitable colours for the pigmented polymer composition include fluorescent colours; metallic colours such as silver, gold, bronze, and copper; and pearlescent pigments. These colours are obtained by employing one or more different types of colorant particles.

The colorant particles include inorganic colorant particles and organic colorant particles. Typically, the colorant particles have average particle diameters in the range of from 10 nm to 50 µm, preferably in the range of from 40 nm to 2 µm.

Suitable inorganic colorant particles include, but are not limited to, titanium dioxide pigments, iron oxide pigments such as goethite, lepidocrocite, hematite, maghemite, and magnetite; chromium oxide pigments; cadmium pigments such as cadmium yellow, cadmium red, and cadmium cinnabar; bismuth pigments such as bismuth vanadate and bismuth vanadate molybdate; mixed metal oxide pigments such as cobalt titanate green; chromate and molybdate pigments such as chromium yellow, molybdate red, and molybdate orange; ultramarine pigments; cobalt oxide pigments; nickel antimony titanates; lead chrome; blue iron pigments; carbon black; and metal effect pigments such as aluminium, copper, copper oxide, bronze, stainless steel, nickel, zinc, and brass.

Suitable organic colorant particles include, but are not limited to, azo pigments, monoazo pigments, diazo pigments, azo pigment lakes, β-naphthol pigments, naphthol AS pigments, benzimidazolone pigments, diazo condensation pigment, metal complex pigments, isoindolinone, and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, and diketopyrrolo pyrrole pigments.

As previously discussed the improvement is significant given the increasingly desired wish from the industry of tinting such liquid applied, air and water barrier coating compositions using liquid based pigment compositions. The liquid applied, air and water barrier coating composition may also comprise one or more pigments, such as carbon black or titanium dioxide, and may also be added as fillers. Since these fillers are only intended to affect the colour of the cured silicone latex elastomer, they are typically added at 0.1 to 20 weight parts, preferably from 0.5 to 10 weight parts, per 100 weight parts of siloxane polymer. Titanium dioxide has been found to be particularly useful as an ultraviolet light screening agent.

Hence, a liquid applied, air and water barrier coating composition as hereinbefore described might comprise, for the sake of example, 30-80 wt. % of SWBE (i) 0.25 to 5 wt. % of rheology modifiers comprising 0.05 to 0.36% wt. of the composition of one or more HASEs with the remainder being one or more other rheology modifiers such as an HEUR, ASE, HEC, SMAT, natural and modified natural materials, such as, for example starch, modified starch, proteins, and modified proteins, dimeric and trimeric fatty acids and/or imidazolines.

The SWBE-based liquid applied, vapour permeable, air and water barrier coating composition utilizing the limited HASE presence has shelf-life stability as defined by maintaining a viscosity of less than (<)100,000 mPa·s after greater than or equal to (≥) 5 weeks of 50° C. heat age testing, alternatively after ≥7 weeks of 50° C. heat age testing which corresponds to >12 months at room temperature and thereby provides:
1) effective stabilization of the formulations for ≥9 months, alternatively ≥12 months,
2) the opportunity for point of sale tinting with aqueous dispersions,
3) the opportunity for point of manufacture tinting with aqueous dispersions, whilst maintaining air and water barrier properties.

The compositions as described above are prepared by first making reaction product (i), by first mixing siloxane polymer (a) and the self-catalysing crosslinker (b) and then introducing water (d) and surfactant (c) to the preformed mixture of (a) and (b) and mixing (a) to (d) together until a high solids gel phase is formed. Any type of mixing equipment may be used including low shear mixing equipment, such as Terrell™, Neulander™ or Ross™ mixers. The other ingredients of the composition may be introduced during the preparation of the pre-cured dispersion or alternatively may be added into the composition in any suitable order prior to use and after mixing, the resulting composition may be diluted with water to the desired silicone content.

Those skilled in the art will recognize that these cross-linked, oil in water dispersions may be prepared in other ways. For instance, the siloxane polymer and self-catalytic crosslinker mixture may be added to a surfactant and water solution and then emulsified using colloid mills, homogenizers, sonolaters or other high shear devices as described in U.S. Pat. Nos. 5,037,878 and 5,034,455. The dispersion may be formed by either a batch process, as described above, or a continuous process. If a continuous process is used, then a low shear dynamic mixer or static mixer is preferred.

The composition as hereinbefore described may be applied onto a suitable substrate by any suitable method. For example, the liquid coating may be spray-applied, brushed, rolled, trowelled or otherwise coated onto a substrate although spraying techniques are preferred. Once applied as a coating on the substrate the composition will form an elastomeric film upon the evaporation of water although it is to be noted that no cure reaction takes place upon application to a substrate the coating merely dries on the substrate surface, typically through water evaporation. Evaporating water from the cross-linked polysiloxane dispersion composition after the cross-linked polysiloxane dispersion composition is applied results in the formation of a silicone latex elastomer on the substrate. The step of evaporation of water may be performed under ambient, or atmospheric conditions at the location of the substrate when the cross-linked polysiloxane dispersion composition is applied. Alternatively, the step of evaporation of water may be performed under artificially heated conditions, produced by one or more heaters.

The composition herein may be used as an air and water barrier, which is preferably vapour permeable, alternatively is vapour permeable, on any suitable substrate, such as for example masonry substrates, such as concrete block, fluted block, brick, stucco, synthetic stucco, poured concrete, pre-cast concrete, insulation finish systems (EIFS), shotcrete, gypsum as well as gypsum board, wood, plywood and any other interior surfaces requiring said barrier coating. The substrate may be located on either the interior or exterior of load bearing supports of a wall assembly. Indeed, the substrate may be the aforementioned load bearing support, e.g., a concrete masonry unit (CMU). Before the liquid applied, air and water barrier coating composition described above is dried, the wall assembly comprises liquid applied, air and water barrier coating composition disposed on the substrate as described above. However, after the liquid applied, air and water barrier coating composition has dried, the wall assembly comprises an air and water barrier coating which is preferably vapour permeable formed from drying or evaporating the composition described above.

The liquid applied, vapour permeable, air and water barrier coating composition as hereinbefore described may be applied at a wet thickness of from 20 mil (0.508 mm) to 50 mil (1.27 mm), or from 20 to 60 mil (1.524 mm) and dries subsequent to application to a dry thickness of from 10 mil (0.254 mm) to 25 mil (0.635 mm), or from 10 to 30 mil (0.762 mm).

Depending on temperature, humidity and wind conditions, the average drying time of the composition is from about 4 to 12 hours and full adhesion and physical properties will be present after only a few days.

The liquid applied, vapour permeable, air and water barrier coating composition as hereinbefore described, once dried on a substrate, meets the requirements of ASHRAE 90.1-2010 for ASTM E2178-11, Standard Test Method for Air Permeance of Building Materials, having an Air Permeance (L/s per m²) of less than 0.006 at a differential pressure of 75 Pa at thicknesses of both 10 mil (0.254 mm) and 15 mil (0.381 mm).

The liquid applied, air and water barrier coating composition, once dried and when (water) vapour permeable, has a Water Vapour Transmission of greater than 7 US Perm (400.49 $ng.s^{-1}m^{-2}Pa^{-1}$), greater than 10 US Perm (572.135 $ng.s^{-1}m^{-2}Pa^{-1}$), or greater than 15 US Perm (858.2035 $ng.s^{-1}m^{-2}Pa^{-1}$), according to the Dry Cup Desiccant Method of ASTM E96/E96M-10 for both the 10 mil (0.254 mm) and 15 mil (0.381 mm) thicknesses, Standard Test Method for Water Vapour Transmission rate of Materials and in accordance with Water Vapour Transmission Wet Cup Water Method of ASTM E96/E96M-10, Standard Test Method for Water Vapour Transmission rate of Materials of greater than 20 US Perm (1144.27 $ng.s^{-1}m^{-2}Pa^{-1}$), greater than 24 US Perm (1373.12 $ng.s^{-1}m^{-2}Pa^{-1}$), greater than 25 US Perm (1430.3375 $ng.s^{-1}m^{-2}Pa^{-1}$), or greater than 30 US Perm (1716.41 $ng.s^{-1}m^{-2}Pa^{-1}$) for coatings of 10 mil (0.254 mm) thickness and for coatings of 15 mil (0.381 mm) thicknesses.

Furthermore, the liquid applied, air and water barrier coating composition as hereinbefore described, once dried passes the Self Sealability (Head of Water) Test described in Section 8.9 of ASTM D1970-09.

Also given that the siloxane is pre-cured it was believed that such compositions would be unable to successfully pass tests such as the Self Sealability (Head of Water) Test described in Section 8.9 of ASTM D1970-09 because it was not expected that the film would be able to self-heal in order to maintain its integrity and prevent water ingress etc. In both cases the composition as hereinbefore described has unexpectedly proven to meet the necessary requirements for these two matters. Furthermore, the coating as described herein has the added advantage over many currently available air and water barrier coatings in that it is compatible with other silicone-based products such as adhesives, caulks and sealants.

Hence, the present composition may be used as an air and water barrier coating, which is preferably vapour permeable or alternatively is vapour permeable, in any building requiring same, for example, cavity wall systems in climatic regions where the provision of air and water barriers which are permeable to (water) vapour are beneficial and when the structure of the cavity wall is designed appropriately. As the skilled man appreciates, cavity wall systems vary in structure to accommodate the local climate, i.e., the relative positions of the insulation and air and water barrier in the cavity wall system as the coating is provided to enable the diffusion of water vapour through the coating and is intended to be applied on a substrate with a view to prevent the risk of moisture getting trapped in the wall cavity. The composition herein is particularly suited for environments in which high levels of (water) vapour permeability are advantageous because of the surrounding climate.

It is known that silicones have excellent overall durability, including ultraviolet radiation exposure on buildings. An air barrier needs to withstand a certain amount of ultraviolet radiation during the period after installation and before the exterior building façade is installed. Some air barriers have a limited exposure time before the manufacturer recommends covering the air barrier with the building façade. As the composition herein is a silicone-based material the ultraviolet durability allows the air barrier to be exposed indefinitely to the atmosphere or for at least a long period of time which could enable greater flexibility during construction or in the event of delays on the jobsite.

Whilst the majority of commercially available coatings cure to a minimum 40 mil (1.016 mm) thickness and often require even thicker coatings the present composition may be coated on a substrate at a thickness of 10 mil (0.254 mm) to 30 mil (0.762 mm) and still meets all necessary tests as will be noted in the following examples avoiding problems encountered with many commercial alternatives which require significantly thicker coatings (e.g., >50mil (1.27 mm)) especially as it is recognised that very thick coatings of air and water barriers can interfere with diffusion. It is to be noted that the present composition contains a pre-cured polysiloxane network prior to application and as such the coating is applied and merely dries on the substrate rather than having the additional need to cure. The composition as hereinbefore described is suitable for providing an evenly distributed coating across the whole surface of a substrate, even when said substrate has an uneven surface and/or is porous.

The coating composition as described herein, when applied onto a substrate, provides substrates with long-term protection from air and water infiltration, normal movement imposed by seasonal thermal expansion and/or contraction, ultra-violet light and the weather. It maintains water protection properties even when exposed to sunlight, rain snow or temperature extremes. Indeed, the composition when tested in accordance with ASTM 1970-09, section 8.6 for low temperature flexibility using a sample having a 15 mil (0.381 mm) coating thickness, passed the test proving that the composition, once applied, remains flexible at low temperatures.

The air and water barrier coating which is also preferably vapour permeable as herein described may be formed by applying a liquid applied, air and water barrier coating composition onto a suitable internal building construction surface. Liquid-applied water, and air, barrier compositions may be applied by any suitable method e.g. be being rolled, painted, sprayed or trowelled onto substrates and resulting coatings become part of the structural wall (after typically being applied from the inside of the building) with the liquid applied, air and water barrier coating composition drying or curing as a monolithic membrane on, in or around the building envelope.

Whilst historically these types of compositions are generally used with walling systems not requiring fastener holes to avoid water penetration therethrough, this is unnecessary for compositions as hereinbefore described as they unexpectedly have been found to reseal. Hence, compositions as hereinbefore described may also be used in situations where there is potential for mislapping or tearing, of the substrates during installation.

One particular advantage over other products is that the liquid applied, air and water barrier coating composition as described herein, when applied onto a substrate, may be exposed for an extended or even indefinite period of time prior to the application of exterior cladding due to their UV stability.

In one embodiment of the disclosure herein there is provided a wall assembly. The wall assembly described herein can comprise the use of the liquid applied, air and water barrier coating composition as an adhesive to bond elastomer material(s) to construction sheathing substrate(s), metal substrate(s) such as painted or unpainted aluminium substrates, galvanized metal substrate(s), wood framing substrate(s) and the like. Other suitable substrates include, for the sake of example, concrete, oriented strand board (OSB), exterior sheathing, preformed panels, plywood and wood or steel stud walls.

Examples

The present disclosure will now be described in detail by way of the following Examples in which all viscosity measurements were taken at room temperature (approximately 21° C.) using a Brookfield DV-III Ultra, Spindle 04, at 2 rpm.

Preparation of Composition

A crosslinked polysiloxane dispersion was prepared by introducing about 2 parts by weight of

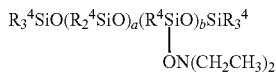

$$R_3^4SiO(R_2^4SiO)_a(R^4SiO)_bSiR_3^4$$
$$|$$
$$ON(CH_2CH_3)_2$$

(where each $R^4$ group is a methyl group) into 100 parts by weight of a hydroxyl dimethyl silyl terminated polydimethylsiloxane having a viscosity of 50,000 mPa·s at 21° C. using a recording Brookfield viscometer with Spindle 3 at 2 rpm according to ASTM D4287-00(2010) in a Turrello mixer. 4 parts of a 1:1 solution of water and surfactant (TERGITOL™ TMN-10) were then added and the resulting mixture was mixed until a high solids emulsion gel was formed. The resulting pre-formed crosslinked polysiloxane dispersion (sometimes referred to as a silicone latex emulsion) was then suitable for mixing with the other ingredients of the composition.

The basic ingredients of the liquid applied, air and water barrier coating compositions used in the examples and counter examples were provided in set amounts, with unless otherwise indicated, the only variables being the wt. % of HASE and the water which was varied dependent on the amount of HASE present so that the total weight % of the composition was always 100%.

All the compositions used in the following examples and counter examples contained the following components:
42.6 wt. % of the previously prepared preformed crosslinked polysiloxane dispersion (silicone latex emulsion)
HASE (commercial products and wt. % indicated in Table 1)
1.01 wt. % of Non HASE rheology modifiers (0.77 wt. % ACRYSOL™ ASE-75 and HEC
0.24 wt % NATROSOL™ 250 HBR) in combination with
24.1 wt. % of colloidal silica,
12.7 wt. % ultrafine calcium carbonate
2.5 wt. % Dupont Ti-PURE® R-706 titanium dioxide pigment
0.8 wt. % non-ionic surfactant, Dow TERGITOL™ TMN-10
1.0 wt. % of antifoam,
0.8 wt. % propylene glycol
1.5 wt. % Chromaflo Lamp Black 808-9907 aqueous carbon black concentrate, with the balance to 100 wt % being made up of water.

The compositions were prepared using the following process:
The crosslinked polysiloxane dispersion, water, nonionic surfactant, and antifoam were mixed together for 10 minutes at 800 rpm and then 5 minutes at 1200 rpm using a Caframo™ overhead mixer with a dispersing style impeller. The HEC was then slowly added over a 2 minute period while mixing at 1200 rpm and then the resulting mixture was further mixed for 5 minutes at 1600 rpm. The colloidal silica was then added and mixing continued for a further 5 minutes at 1600 rpm. The calcium carbonate and titanium dioxide were then introduced and the resulting mixture was further mixed for 15 minutes at 1600 rpm after which a premixture of HASE and ACRYSOL™ ASE-75 was slowly added over a 5 minute period while mixing at 1200 rpm, propylene glycol was then added followed by a further 5 minutes of mixing at 1200 rpm; when present aqueous Lamp Black Concentrate, was then added followed by a further 5 minutes of mixing at 1200 rpm and finally the resulting mixture was de-aerated under vacuum using a FlackTek SpeedMixer™ at 2000 rpm for 2 minutes and then filtered prior to use.

A variety of physical properties of samples of each composition prepared were determined for both examples and comparative examples.

Water Vapour Transmission rate is the steady water vapor flow in unit time through unit area of a body, normal to specific parallel surfaces, under specific conditions of temperature and humidity at each surface and was tested according to the ASTM E96/E96M-10, Standard Test Method.

Nail sealability is determined using the Self Sealability (Head of Water) Test described in Section 8.9 of ASTM D1970-09. It assesses the nail sealability requirements of bituminous roofing systems but is a commonly used standard for air barrier materials. It is an important test because elastomeric materials do not innately have a self-sealing property. All examples and counter examples prepared met or exceeded the acceptable values depicted in Table 1 below.

TABLE 1

| Requirement | Test | Units | Acceptable Value(s) |
|---|---|---|---|
| Water Vapor Permeability | ASTM E96 (Method B) | US Perms (ng · s⁻¹ · m⁻² · Pa⁻¹) | >15 (>858.2) |
| Sag Resistance | D 4400 | Wet mils (mm) | 40-60 (1.016-1.524) |
| Colour | Y value | — | 22-27 |
| Tensile | ASTM D 412 | psi (kPa) | >180 (>1241.1) |
| Elongation | ASTM D 412 | % | >400 |
| Adhesion | D4541 - Concrete | psi (kPa) | >120 (>827.4) |
| Adhesion | D4541 - Fiberglass mat gypsum | psi (kPa) | >40 (275.8) |
| Crack Bridging | ASTM C1305 | — | Pass |
| Nail Sealability | ASTM D1970, Section 8.9 | — | Pass |

Historically, cross-linked polysiloxane dispersions have had shelf-life problems as previously discussed. Samples are considered to have exceeded their shelf life once the viscosity has exceeded 100,000 mPa·s at room temperature (approximately 21° C.). To determine the shelf-life of samples of each example and comparative prepared above compositions were subjected to the following in-house Accelerated Shelf-Life Aging Test:
1. Add samples prepared according to procedure above into sealed container, and place in oven at 50° C.
2. Every 7 days remove samples from oven, cool to room temperature (21° C.), and measure viscosity.
3. Reseal container lid and return to oven for additional aging.
4. Repeat steps 2 and 3 until samples reach >100,000 mPa·s at room temperature
5. Record viscosity value for each week that a sample is at or below 100,000 mPa·s at room temperature.
6. It has been determined that an A value of 6 weeks or greater defines a shelf-life of 12 months or greater according to Arrhenius behavior using a conservative Q10 factor of 2.1.

Viscosity measurements taken during the accelerated Shelf-Life Aging Test were done so using a Brookfield® DV-III Ultra, Spindle 04, at 2 rpm and room temperature (21° C.), 1. Let samples cool to room temperature (if at elevated temperature). Remove lid.
2. Mix samples by hand with tongue depressor before measuring
3. Lower spindle until it touches bottom of container, then raise ¼ inch (0.635 cm).
4. Start instrument and wait until steady state measurement is obtained.

The HASE type and HASE concentration and time to reach a viscosity of 100,000 mPa·s at room temperature for each example are described in Table 2

TABLE 2

| Example | HASE type | HASE concentration (wt. %) | Time to 100K mPa · s (weeks) |
|---|---|---|---|
| E. 1 | Acrysol ™ Primal HT-400 | 0.12 | 11.5 |
| E. 2 | Acrysol ™ TT-615 | 0.12 | 11.5 |
| E. 3 | Aculyn ™ 88 | 0.12 | 9.5 |
| E. 4 | Acrysol ™ TT-615 | 0.36 | 7.5 |
| E. 5 | Aculyn ™ 28 | 0.12 | 7.5 |
| E. 6 | Aculyn ™ 88 | 0.36 | 7.5 |
| E. 7 | Rheotech ™ 4800 | 0.36 | 7.5 |
| E. 8 | Romax ™ 7011 | 0.36 | 7.5 |

A series of comparatives were prepared. The only difference in the compositions for the Examples above was that the HASE content was outside the range (above) indicated in the above description as well as the water level to compensate to make 100 wt. %.

The HASE type and HASE concentration and time to reach a viscosity of 100,000 mPa·s at room temperature for each comparative example are described in Table 3.

TABLE 3

Time in weeks at 50° C. to 100,000 mPa · s

| Comparative Example | HASE type | HASE concentration (wt. %) | Time to 100K mPa · s (weeks) |
|---|---|---|---|
| CE. 1 | Romax ™ 7011 | 0.6 | 2.5 |
| CE. 2 | Aculyn ™ 88 | 0.42 | 2 |
| CE. 3 | Aculyn ™ 88 | 0.48 | 2 |
| CE. 4 | Aculyn ™ 28 | 0.6 | 1.5 |
| CE. 5 | Aculyn ™ 88 | 0.54 | 1.5 |
| CE. 6 | Aculyn ™ 88 | 0.6 | 1.5 |

Comparative Example 7

C.E. 7 demonstrates the extended shelf-life of a sample without carbon black but with a HASE level of >0.36 wt. %. The HASE type and HASE concentration and time to reach a viscosity of 100,000 mPa·s at room temperature for comparative example 8 is described in Table 4.

TABLE 4

| HASE type | HASE concentration (wt. %) | Time to 100K mPa · s (weeks) |
|---|---|---|
| CE. 8 UCAR Polyphobe 107 | 0.42 | 1.5 |

It will be seen that all examples in Table 2 had extended shelf lives whereas all the counter examples in Tables 3 and 4 did not.

The invention claimed is:

1. A liquid applied, air and water barrier coating composition, the liquid coating composition comprising:
   (i) a crosslinked polysiloxane dispersion of:
      a reaction product of (a) a siloxane polymer having at least two —OH groups per molecule, or a polymer mixture having at least two —OH groups per molecule, and having a viscosity of between 5000 to 500,000 mPa·s at 21° C., and (b) at least one self-catalyzing crosslinker reactive with component (a), and
   additionally comprising (c) a surfactant and (d) water;
   (ii) a combination of rheology modifiers in an amount of from 0.25 to 5 wt. % of the composition, comprising one or more hydrophobically modified alkali swellable emulsions in an amount of from about 0.1 to 0.36 wt. % of the composition and one or more other rheology modifiers; and
   at least one of the following ingredients:
   (iii) one or more fillers selected from the group consisting of colloidal silica, fumed silica, precipitated silica, diatomaceous earths, ground quartz, kaolin, calcined kaolin, wollastonite, hydroxyapatite, calcium carbonate, hydrated alumina, magnesium hydroxide, carbon black, titanium dioxide, aluminium oxide, vermiculite, zinc oxide, mica, talcum, iron oxide, barium sulphate, slaked lime, and mixtures thereof; and/or
   (iv) one or more stabilizers.

2. The liquid coating composition in accordance with claim 1, wherein the combination of rheology modifiers (ii) comprises one or more hydrophobically modified alkali swellable emulsions in an amount of from 0.1 to 0.36 wt. % of the composition and the other rheology modifiers in an amount of from 0.5 to 3 wt. % of the composition.

3. The liquid coating composition in accordance with claim 1, wherein the combination of rheology modifiers (ii) comprises one or more hydrophobically modified alkali swellable emulsions together with one or more alkali swellable emulsions, one or more hydrophobe modified ethoxylated urethanes, hydroxyethyl celluloses and/or styrene-maleic anhydride terpolymers.

4. The liquid coating composition in accordance with claim 1, wherein the combination of rheology modifiers (ii) consists of a mixture of one or more hydrophobically modified alkali swellable emulsions with one or more alkali swellable emulsions and/or one or more hydroxyethyl celluloses.

5. The liquid coating composition in accordance with claim 1, wherein the composition further comprises one or more of the following additives: rheology modifiers, which are not associative thickeners; solvents; pigments/colorants; defoamers;
   preservatives; buffers; fire retardants; coalescents; disinfectants; corrosion inhibitors;
   antioxidants; antifoams; biocides; flow agents; leveling agents; antifreeze materials; and/or neutralizing agents.

6. The liquid coating composition in accordance with claim 1, wherein the composition further comprises an aqueous dispersion of pigments/colorants.

7. The liquid coating composition in accordance with claim 1, wherein the composition has a shelf life of at least 9 months.

8. A wall assembly having an internal side and an external side, wherein either or both of the sides is coated with a dried coating of the liquid coating composition in accordance with claim 1.

9. The wall assembly in accordance with claim 8, wherein the liquid coating composition is applied on to a substrate at a wet thickness of from 20 mil (0.508 mm) to 60 mil (1.524 mm) and dries after application to a dry thickness of from 10 mil (0.254 mm) to 30 mil (0.762 mm).

10. The wall assembly in accordance with claim 8, wherein the liquid coating composition, once dried on a substrate, meets the requirements of ASTM E2178-11, Standard Test Method for Air Permeance of Building Materials, having an Air Permeance (L/s per m$^2$) of less than 0.006 at a differential pressure of 75 Pa at thicknesses of both 10 mil (0.254 mm) and 15 mil (0.381 mm).

11. The wall assembly in accordance with claim 8, wherein the liquid coating composition, once dried on a substrate, meets Water Vapour Transmission Dry Cup Desiccant Method in accordance with ASTM E96/E96M-10, Standard Test Method for Water Vapour Transmission rate of Materials of greater than 7 US Perm (572.135 ng·s$^{-1}$m$^{-2}$Pa$^{-1}$), for both 10 mil (0.254 mm) and 15 mil (0.381 mm) thicknesses, and Water Vapour Transmission Wet Cup Water Method in accordance with ASTM E96/E96M-10, Standard Test Method for Water Vapour Transmission rate of Materials of 30 US Perm (1716.41 ng·$^{-1}$m$^{-2}$ Pa$^{-1}$) for coatings of 10 mil (0.254 mm) thickness and greater than 24 US Perm (1373.12 ng·$^{-1}$m$^{-2}$ Pa$^{-1}$) for coatings of 15 mil (0.381 mm) thickness.

12. The wall assembly in accordance with claim 8, wherein the liquid coating composition, once dried on a substrate, passes the Self Sealability (Head of Water) Test described in Section 8.9 of ASTM D1970-09.

13. The wall assembly in accordance with claim 8, wherein the liquid coating composition is coated onto a substrate selected from the group consisting of construction sheathing substrates, metal substrates, galvanized metal substrates, wood framing substrates, concrete masonry, foam plastic insulated sheeting, exterior insulation, pre-formed concrete, cast in place concrete wood framing, oriented strand board (OSB), exterior sheathing, preformed panels, plywood and wood or steel stud walls, roofing felting for roofing membranes, and non- permeable wall assemblies.

14. The wall assembly in accordance with claim 8, wherein the dried coating is vapour permeable.

15. The liquid coating composition in accordance with claim 1, wherein the combination of rheology modifiers (ii) comprises one or more hydrophobically modified alkali swellable emulsions in an amount of from 0.12 to 0.36 wt. % of the composition.

16. A method of treating a wall assembly, having an internal side and an external side, the method comprising:
applying the liquid coating composition in accordance with claim 1 on either or both of the sides by spraying, brushing, or rolling.

17. The method in accordance with claim 16, further comprising evaporating water from the liquid coating composition after application to the side(s).

18. The method in accordance with claim 16, wherein the liquid coating composition is applied on to a substrate at a wet thickness of from 20 mil (0.508 mm) to 60 mil (1.524 mm) and dries after application to a dry thickness of from 10 mil (0.254 mm) to 30 mil (0.762 mm).

\* \* \* \* \*